May 8, 1956 R. C. WAY ET AL 2,744,329
CONSTANT PRESSURE SCRIBER
Filed May 5, 1954
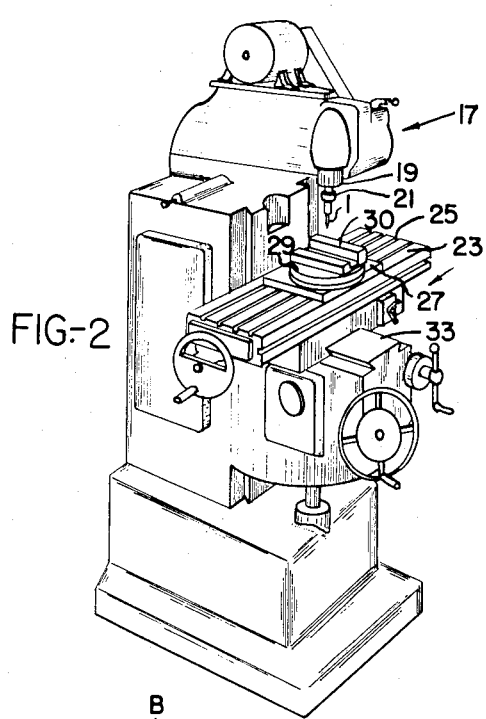
FIG.-2
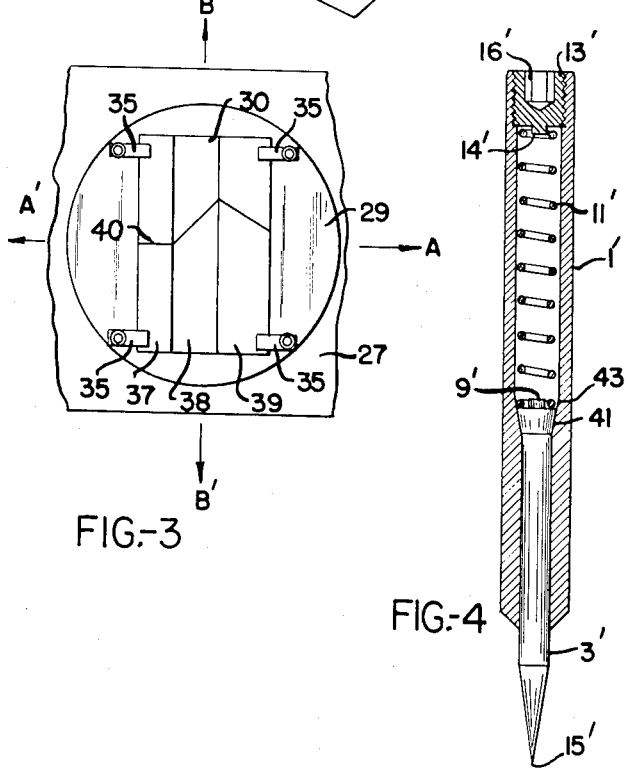
FIG.-3
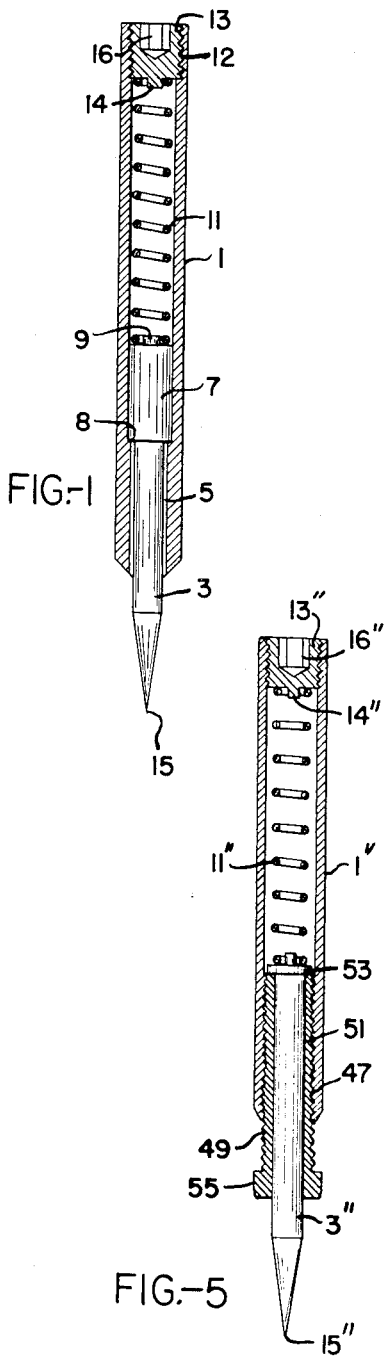
FIG.-1
FIG.-4
FIG.-5
INVENTOR.
RAYMOND C. WAY
MERLE L. DOWNS
BY Toulmin & Toulmin
ATTORNEYS

United States Patent Office 2,744,329
Patented May 8, 1956

2,744,329

CONSTANT PRESSURE SCRIBER

Raymond C. Way and Merle L. Downs, Dayton, Ohio, assignors to The Commonwealth Engineering Company of Ohio, Dayton, Ohio, a corporation of Ohio Application May 5, 1954, Serial No. 427,760

1 Claim. (Cl. 33—18)

This invention relates to a scribing device which has particular utility in conjunction with power driven machine tools; the scriber is adapted to be inserted in and retained by a collet of a machine tool and to be utilized for the scribing of lines of uniform depth and of substantially any contour while in this position.

The invention particularly contemplates the provision of a scriber which may be inserted in a machine tool in the precise position which the tool cutting the scribed lines will have; the scriber is thus not only rigidly held while scribing but is related to the cutting position in such manner that accuracy is assisted by the combination of the scriber with the machine tool itself.

The invention also has for a primary object the provision of a scriber having a retractable scribing needle, the scriber being provided with a bearing surface which permits precisely linear retraction of the point of the scriber under slight uniform pressure.

Another important object of the invention is to provide a scribing device for use in conjunction with a milling machine, for example, to accomplish with the combination the marking of scribed lines at various heights on a workpiece on the table of the milling machine; the scribing point is retracted into the milling machine to raise the scribing point to the various scribing heights and the scriber cooperates in the various positions of height to impart a scribed line of substantially constant depth to a workpiece on the table.

A further object of the invention is to provide a novel method of scribing workpieces which are to be cut with a machine tool.

These and other allied objects of the invention are attained by providing a scriber having a tubular member receivable in a collet of a machine tool, the tubular member retaining a spring biased plunger which is rectilineally movable inwardly and outwardly of the member to contact a workpiece with a lower extremity thereof, which extremity is provided with a scribing point.

It is very important that the plunger be supported against relative lateral movement with respect to the tubular member and with respect to a machine tool which supports the tubular member and the retention against the movement is suitably accomplished by providing a relatively long and accurate bearing surface for the plunger.

A spring which effects the outward biasing of the plunger to extend the portion thereof having the scribing point preferably exerts a substantially constant pressure on the plunger and scribing point at all levels of extension of the point. This is effectively achieved in substantially all scribing operations by utilizing a very light helical coil expansion spring. Such a spring is effective to urge the plunger outwardly with a light pressure but permits ready retraction of the plunger and scribing point when a light pressure is exerted on the scribing point. In this latter connection it is to be noted that in the use of the scriber in a vertical position gravity will assist the spring in urging outward movement of the plunger from the tubular member supporting the plunger.

The invention will be more fully understood by reference to the following detailed description and accompanying drawings, which are set forth by way of illustration and not by way of limitation, and wherein:

Figure 1 is a vertical sectional view illustrating the scriber of invention;

Figure 2 is a schematic view in vertical elevation illustrating the use of the scriber and a machine tool in conjunction;

Figure 3 is a view taken on line 3—3 of Figure 2;

Figure 4 is a view of a modification of the structure of invention; and

Figure 5 is a view of yet another modification of the structure of invention.

Referring to the drawings there is shown in Figure 1 at 1 a tubular member in the form of a longitudinally extending collet provided at 3 with a plunger, a lower smaller diameter portion of which at 5 slightly spaced from the member 1 to provide a clearance for free movement of the plunger outwardly of the member. The plunger at 7 is provided with an enlarged portion which serves as a bearing and smoothly engages the inner wall of the tubular member 1 and abuts against an inner peripheral shoulder 8 of the collet to prevent the plunger from moving completely outwardly of the collet.

The enlarged portion 7 is provided at 9 integral therewith a solid projection which is engaged by and retains the lower end of extension spring 11, the spring abutting against the upper enlarged portion 7 of the plunger.

The member 1 is internally threaded at the upper end thereof at 12 and a cap 13 is threadedly received within the member and abuts against the upper end of spring 11. The cap is provided with an interior solid portion 14 about which the spring engages to be retained thereby. The cap is also provided at 16 with a socket which is adapted to receive, for example, a screw driver for effecting insertion of the cap into the member.

The lower end of the plunger at 15 is provided with a needle point for effecting a scribing action and pressure on the point causes the plunger to move upwardly substantially free against the extension spring 11 to impart a substantially constant pressure to the scribing point within the normal limits of movement of the plunger of the particular scribing device.

Referring now to Figure 2 there is indicated at 17 the head of, for example, a boring machine which is provided with a column 19 having a collet 21 in which there is secured, for example, the scriber of Figure 1, the tubular member being indicated at 1; positioned beneath this scriber is the usual table 23 of the machine which is adapted to move longitudinally beneath the scriber as indicated by the arrow A.

The table is provided with slots at 25 in which a base 27 may be secured in a known manner and the base is itself provided with a hand rotatable work support 29 on which there is positioned as shown a workpiece 30 adapted to be scribed at different levels without vertical movement of the scriber and machine tool between scribing actions on the surfaces at the various levels. The work support 29 and the base 27 may be suitably provided with usual indexing scales for accurately locating the lines to be scribed. The table 23, as already noted, is supported for longitudinal movement and the machine is likewise provided at 33 with means for moving the table itself transversely of the length thereof beneath the machine head. Such a machine tool arrangement is standard practice for many units and accordingly it is not considered necessary to illustrate the same in further detail.

As shown in Figure 3 the work support 29 carries the workpiece 30 and the same are adapted to be fed as a unit in the directions A and A' or the directions B and B' as desired, beneath the head of the machine tool. The workpiece is held on the support by suitable clamps indicated at 35 across the surfaces 37, 38, 39 and provided with a continuous line indicated at 40, which line will be at various heights in the different sections as most clearly seen in Figure 2.

To effect scribing the needle point of the scriber is positioned on the workpiece at one extremity of the line 40 and the tool is powered to drive the workpiece beneath the scriber to provide the line. As the workpiece moves in contact with the scriber point in a predetermined manner the scriber plunger, as 3 of Figure 1, retracts against the spring and provides a substantially constant pressure and therefore a scribed line of uniform depth on the workpiece. It is thereafter merely necessary to replace the scriber with a cutting tool to effect the required cutting operation on the completed line 40. It will be understood that by appropriate manipulation of the machine tool substantially any contour may be provided on a workpiece.

Referring now to Figure 4 wherein there is shown a modified embodiment of the invention. The member 1' is provided with a plunger 3' which is urged outwardly of the member by the spring 11' abutting against the cap 13' and the upper conical portion 41 of the plunger. In this instance the member 1' is provided at 43 with an internal conical seat which mates the conical portion 41 of the plunger 3' and restricts the outward passage of the plunger from the member.

Referring to Figure 5 wherein another embodiment of the structure of invention is shown and which structure is particularly adapted for setting the initial height of the plunger with respect to the machine tool, there is shown at 1" a tubular member which is internally threaded at its lower end 47; a nut 49 externally threaded and centrally bored at 51 is received within the threaded end 47 and engages at its upper end an enlarged portion 53 of a plunger 3" which plunger is provided at 15" with a scribing point. The lowermost portion of the nut 49 is knurled at 55 to provide a grip for threading the nut into the member 1" to various depths as desired to initially set the position of the plunger and that of the spring 11" for particular circumstances. This latter arrangement is most useful where a considerable variation in height occurs in the workpiece to be scribed.

The scriber components of the invention has utility when scribing is effected by hand, but its superiority over other scribing devices is most pronounced when used in conjunction with a machine tool. For this purpose it is only necessary that the tubular member be sufficiently rigid to be accommodated to the tube; it is preferable in this respect that the body walls be solid to avoid ingress of dirt thereto.

It is to be noted that the cap 13 or its equivalent in the other drawings may also be effectively employed to initially bias the spring when such is desired, the prime advantage of the structure of Figure 5 being that the spring may be biased to a greater or lesser degree while the scribing device is in the machine tool.

It will be understood that this invention is susceptible to modification in order to adopt it to different usages and conditions and accordingly, it is desired to comprehend such modifications within this invention as may fall within the scope of the appended claim.

We claim:

A scribing device for power driven machine tools to scribe lines at various heights on the workpiece, said device comprising an elongated tubular member threaded at both ends and having an uppermost large diameter section and a lower communicating smaller diameter section, an elongated nut threaded into said lower smaller diameter section, said nut having a smooth walled central bore extending lengthwise therethrough, a scriber tool slidably mounted in the bore of said nut, said tool having an enlarged head portion of larger diameter than said bore and an integral elongated shank which slidably fits in said bore and is adjustably positioned in said tubular member by threading in or out of said nut, said scriber tool being arranged to slidably extend from the lower end of said nut, said shank terminating in a tapered extremity defining a scribing needle contact point, a coil spring disposed in said tubular member and arranged in said uppermost large diameter section and urging said scriber tool to extend outwardly of said tubular member and seat said enlarged head portion against the inner end of said nut, a cap threadedly engaged in the uppermost end of said tubular member and abutting the upper end of said coil spring, said cap being screwed inwardly or outwardly of the tubular member for increasing or decreasing pressure exerted by said coil spring on the head portion of said scriber tool.

References Cited in the file of this patent

UNITED STATES PATENTS

| | | |
|---|---|---|
| 487,988 | Cameron | Dec. 13, 1892 |
| 1,191,725 | Paulsen | July 18, 1916 |
| 1,217,572 | Craley | Feb. 27, 1917 |
| 1,220,597 | Bracke | Mar. 27, 1917 |
| 2,436,542 | Black | Feb. 24, 1948 |
| 2,480,168 | Thompson | Aug. 30, 1949 |
| 2,504,832 | Groome | Apr. 18, 1950 |
| 2,514,003 | Martin | July 4, 1950 |

FOREIGN PATENTS

| | | |
|---|---|---|
| 80,177 | Germany | Mar. 7, 1895 |
| 141,601 | Germany | May 29, 1903 |